United States Patent
Molaro et al.

(10) Patent No.: US 10,291,393 B1
(45) Date of Patent: *May 14, 2019

(54) DATA DEDUPLICATION AND COMPRESSION EVALUATION METHODS AND SYSTEMS

(71) Applicant: CITIGROUP TECHNOLOGY, INC., Weehawken, NJ (US)

(72) Inventors: Donald Joseph Molaro, Cupertino, CA (US); Stephen M. Hopkins, Kent (GB); Chris Howarth, Surrey (GB)

(73) Assignee: CITIGROUP TECHNOLOGY, INC., Weehawken, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/059,436

(22) Filed: Aug. 9, 2018

Related U.S. Application Data

(63) Continuation of application No. 14/957,168, filed on Dec. 2, 2015, now Pat. No. 10,075,291, which is a continuation-in-part of application No. 14/723,245, filed on May 27, 2015, now Pat. No. 9,887,834.

(51) Int. Cl.
*H04L 9/06* (2006.01)
*G06F 17/30* (2006.01)

(52) U.S. Cl.
CPC ...... *H04L 9/0618* (2013.01); *G06F 17/30115* (2013.01)

(58) Field of Classification Search
CPC .................. H04L 9/0618; G06F 17/30115
USPC ........................................... 713/189
See application file for complete search history.

(56) References Cited

U.S. PATENT DOCUMENTS

| | | |
|---|---|---|
| 9,141,554 B1 | 9/2015 | Candelaria |
| 2006/0067527 A1 | 3/2006 | Urivskiy et al. |
| 2006/0291650 A1 | 12/2006 | Ananth et al. |
| 2007/0081668 A1 | 4/2007 | McGrew et al. |
| 2009/0048997 A1 | 2/2009 | Manickam et al. |
| 2010/0299313 A1 | 11/2010 | Orsini et al. |
| 2011/0078669 A1 | 3/2011 | Mersh et al. |
| 2014/0114936 A1 | 4/2014 | Araki et al. |
| 2014/0337640 A1 | 11/2014 | Sharma et al. |

(Continued)

OTHER PUBLICATIONS

Office Action for U.S. Appl. No. 14/957,168, dated Jan. 9, 2018, 38.

(Continued)

*Primary Examiner* — Kambiz Zand
*Assistant Examiner* — Benjamin A Kaplan
(74) *Attorney, Agent, or Firm* — Johnson, Marcou & Isaacs, LLC; John M. Harrington, Esq.

(57) ABSTRACT

Deduplication and compression evaluation methods and systems involve one or more processors obfuscating plain text file data in each file of a computer file system using a first cipher encryption scheme, obfuscating each plain text file name representing the plain text file data in each file of the computer file system using a second cipher encryption scheme, and associating each obfuscated file name representing the plain text file data of each of the plurality of files of the computer file system with the obfuscated file data of each of the plurality of files of the computer system. In addition, each plain text directory name for each of the obfuscated file names associated with the obfuscated file data in each of the plurality of files of the computer file system is obfuscated using a third cipher encryption scheme.

18 Claims, 6 Drawing Sheets

(56) References Cited

U.S. PATENT DOCUMENTS

2014/0372460 A1    12/2014   Joy et al.
2015/0143112 A1     5/2015   Yavuz et al.

OTHER PUBLICATIONS

Office Action for U.S. Appl. No. 14/723,245, dated Dec. 20, 2016, 35.
Final Office Action for U.S. Appl. No. 14/723,245, dated May 9, 2017, 35.
"Filenames Display without Entering the Password When an Encrypted Zip file is Opened", WinZip Computing; Knowledgebase, Article ID: 147, Feb. 20, 2013, 2.
Ritter, "Substitution Cipher with Pseudo-Random Shuffling: The Dynamic Substitution Combiner", Cryptologia, vol. 14, No. 4, pp. 289-303, http://www.ciphersbyritter.com/ARTS/DYNSUB2.HTM, 1990, 1-12.

```
03d5e8333cef08cbb38e6a1c82c8726:./theta-generate.d
0a234a1033af35e2db4896a33bf9946d:./theta-generate-test.o
0f5629f939f78a314c6646c4a9fb989a4:./theta-fts.h
1d759e267cfd8d2b2158f60fff2ea8e:./theta-read.d
20670216lf94c5cd39fadd03f4014d98:./foo.bar.data/CURRENT,./J82.9Hg.yeB9g/tIMERxX
22bf0e81636b1b45051b138f48b3d148:./foo.bar.data/MANIFEST-000002,./J82.9Hg.yeB9g/SusRk0m7-yjcCNy
231ba6d34076ecd2d21daa7b55c4b243:./theta-utest.cc
23b4b61ca459003f1a0b31c85588cf62:./theta-generate-test.cc
31991d19f4020c1e2ced2814c015b3bf:./theta-show.d
3c6e02cc011626e5d33a41265d14372e:./theta.cc
3ddb6b18e5cc157c00e17d60cd4256fd:./theta-show.o
4da51d298780d213cd172beb9c77657d:./theta.h
5243cd8cf3daf49fb8496d268b046e3b:./theta-generate.cc
52899cb67867cf4f794677028a6c48ad:./theta-fts.o
5c355c8020f04ecc20ca56dceccb84c3:./TODO.txt
```
160

```
10e9891a0fe77c019c6ac63db542315b:./DrBfY-wgiqp
1d759e267cfd8d2b2158f60fff2ea8e:./DrBfY-gQQM.y
20670216lf94c5cd39fadd03f4014d98:./J82.9Hg.6wpf/hrAMcmQ,./J82.9Hg.yeB9g/tIMERxX
22bf0e81636b1b45051b138f48b3d148:./J82.9Hg.6wpf/r6abCRUX-AyjcCg,./J82.9Hg.yeB9g/SusRk0m7-yjcCNy
231ba6d34076ecd2d21daa7b55c4b243:./DrBfY-wgiqp.rk
29c1ffa204886a506a6f0bbcf040e8ed:./u0OEhmVQ
31991d19f4020c1e2ced2814c015b3bf:./DrBfY-InHQ.y
516efffd6c10b92edc482d41c39a13f8:./J82.9Hg.yeB9g/eqo
52899cb67867cf4f794677028a6c48ad:./DrBfY-Rgv.y
5c355c8020f04ecc20ca56dceccb84c3:./dLQ8.wcg
64ac8c5dc07ed342e75ea961c566540a:./DrBfY-IniKE
6924edc0c316b86665af68348c57bfc3:./DrBfY-gQQM-vaVu.57
7169537845337791dfec522f535349e0:./DrBfY-Rgv.iF
7799e508ef19542c0bc20489bc82a85b:./DrBfY-IniKE.rk
7ff3fdc67c08fec72251b08b70da7fa5:./DrBfY.q
81427966a3c326cf0666dbd00c765974:./DrBfY-InHQ-vaVu.57
```
162

Obfuscate

FIG. 5

DATA DEDUPLICATION AND COMPRESSION EVALUATION METHODS AND SYSTEMS

PRIORITY APPLICATION

This application is continuation of co-pending U.S. patent application Ser. No. 14/957,168 filed Dec. 2, 2015, entitled "Data Deduplication and Compression Evaluation Methods and Systems", which was a continuation-in-part of U.S. patent application Ser. No. 14/723,245 filed May 27, 2015, entitled "Data Deduplication and Compression Evaluation Methods and Systems", now U.S. Pat. No. 9,887,834 issued Feb. 6, 2018, each of which is incorporated herein by this reference.

FIELD OF THE INVENTION

The present invention relates generally to the field of data storage devices and more particularly to methods and systems for generating "synthetic" data sets for evaluating deduplication and compression systems for data storage devices and file systems.

BACKGROUND OF THE INVENTION

Data deduplication may be characterized as a specialized data compression technique for eliminating duplicate copies of repeating data, thereby reducing the amount of storage needed for a given quantity of data. A current problem faced by entities that store data is the complicated, time-consuming process that is typically involved in evaluating and comparing vendor designs of deduplication and compression systems employed in data storage. Another problem currently facing such entities is the need to protect its confidential information, as well as the legal duty of such entities to protect personally identifiable information (PII), stored in its data storage systems from exposure outside the entity.

The types of systems that such entities may be interested in evaluating are typically data storage systems designed to store large amounts of data. Such data storage systems may be referred to in the industry as block storage devices. Such block storage devices may include, for example, both disc-storage systems and flash-based storage systems. In a block storage device, each individual data element may have a particular size, such as 4096 bytes, and each individual block of data stored on that storage device is accessible by a unique address that may be referred to as a logical block address (LBA)

Typically, an entity, such as a financial institution, health care organization, or government agency may not be permitted to take copies of data that contains PII outside of the entity. Therefore, it is typically not possible for such entities to allow use of copies of data at a vendor site or in a laboratory environment that is not controlled by the entity for evaluation of the vendor's system designs. A traditional approach to this problem has been for an entity to engage with a systems vendor and have the vendor provide its product to the entity for evaluation. The entity may then install the vendor's product in one of the entity's own facilities and perform an evaluation of the vendor's system design by and under the entity's control. That traditional evaluation process may typically take up to six or more months to complete.

There is a present need for methods and systems that enable rapid evaluation of potential vendor designs of deduplication and compression systems and that ensure an apples-to-apples comparison of competing designs. There is presently a further need for methods and systems that assure that the results of tests to evaluate those designs are valid against one another and that they do not expose any PII or confidential information of entities that is stored in the systems of such entities.

Other types of systems which entities may be interested in evaluating may comprise, for example, file systems including, without limitation, disc-based file systems, network-based file systems, and virtual file systems. A relatively simple example of a file system may be a C: drive of a computer having WINDOWS® operating system installed. The C: drive of the computer and all of the data and files on the C: drive may be characterized as an example of a single self-contained file system that makes no reference to anything outside itself.

A common occurrence may be copying the same file multiple times in multiple different places on the C: drive. Consequently, the same data may be stored multiple times in the file system of the computer. Similarly, in the case, for example, of a file server in an organization, as documents are sent back and forth between various people in the organization, such documents may be repeatedly saved and resaved. Such repeated storage of copies of the same data is a significantly inefficient use of storage space.

There is also a present need for deduplication and compression methods and systems for evaluating file systems to enable recognition of data that was already stored and to store, for example, only a reference to such data.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods described herein.

Thus, embodiments of the invention provide methods and systems for generating "synthetic" data sets for evaluating deduplication and compression systems for data storage devices that involve, for example, generating, by one or more processors coupled to memory, a hash value for each block of data in a block storage device; creating, likewise by the one or more processors, a random substitution cipher using the respective hash values for each of said blocks of data as seed values to a random number generator; randomly shuffling, also by the one or more processors, positions of run lengths for each of said blocks of data with no run lengths having identical run length values disposed adjacent one another; and generating, by the one or more processors, a synthetic version of each of said blocks of data using the substituted, shuffled, run lengths.

Other aspects of embodiments of the invention, may involve, for example, mapping the respective hash values to identifiers for corresponding blocks of data. In other aspects, mapping the respective hash values to identifiers for corresponding blocks of data may involve, for example, mapping the respective hash values to the identifiers for the corresponding blocks of data in a same order and frequency as the blocks of data in the block storage device. In further aspects, mapping the respective hash values to identifiers for corresponding blocks of data may involve, for example, mapping a same hash value for multiple corresponding blocks of data to identifiers for the multiple corresponding blocks of data as a group. In additional aspects, the block storage device may comprise, for example, a disc storage device and/or a flash array storage device.

In further aspects of embodiments of the invention, generating the synthetic version of each of said blocks of data using the substituted, shuffled, run lengths may involve, for example, generating a synthetic version of the block storage device using the synthetic version of each of said blocks of data. In still further aspects, generating the synthetic version of each of said blocks of data using the substituted, shuffled, run lengths may involve, for example, generating the synthetic version of each of said blocks of data having a same entropy value as an entropy value of the blocks of data in the block storage device. In other aspects, generating the synthetic version of each of said blocks of data having a same entropy value as an entropy value of the blocks of data in the block storage device may involve, for example, generating the synthetic version of each of said blocks of data having the same randomness as the blocks of data in the block storage device.

In additional aspects of embodiments of the invention, generating the synthetic version of each of said blocks of data using the substituted, shuffled, run lengths may involve, for example, generating the synthetic version of each of said blocks of data having a same compressibility as the blocks of data in the block storage device. In still further aspects, generating the synthetic version of each of said blocks of data using the substituted, shuffled, run lengths may involve, for example, generating the synthetic version of each of said blocks of data having a same run length histogram as a run length histogram for the blocks of data in the block storage device.

Additional aspects of embodiments of the invention may involve, for example, creating a run length histogram based on run length values and frequency of run lengths for each of said blocks of data in the block storage device. Further aspects may involve, for example, creating a run length histogram based on run length values and frequency of run lengths for said synthetic version of each of said synthetic blocks of data. Other aspects may involve, for example, comparing the run length histogram for said blocks of data in the block storage device to said run length histogram for said synthetic version of said blocks of data. Still other aspects may involve, for example, determining an entropy value for the blocks of data in the block storage device and an entropy value for said synthetic version of said blocks of data. Still further aspects may involve, for example, comparing the entropy values for the blocks of data in the block storage device to the entropy value for said synthetic version of said blocks of data.

Other embodiments of the invention may provide methods and systems for generating an obfuscated version of files in a file system having a same randomness and compressibility as the plain text files in the file system that involve, for example, obfuscating, by one or more processors, plain text file data in each of a plurality of files of a computer file system using a first cipher encryption scheme; obfuscating, by the one or more processors, each plain text file name representing the plain text file data in each of the plurality of files of the computer file system using a second cipher encryption scheme; and associating, by the one or more processors, each obfuscated file name representing the plain text file data of each of the plurality of files of the computer file system with the obfuscated file data of each of the plurality of files of the computer file system.

Other aspects of embodiments of the invention, may involve, for example, obfuscating each plain text directory name for each of the obfuscated file names associated with the obfuscated file data in each of the plurality of files of the computer file system using a third cipher encryption scheme. In other aspects, obfuscating each plain text directory name may involve, for example, obfuscating each character, except predefined directory naming convention characters, of each plain text directory name for each of the obfuscated file names associated with the obfuscated file data in each of the plurality of files of the computer file system using a substitution cipher.

In further aspects of embodiments of the invention, obfuscating each plain text file name may involve, for example, obfuscating each plain text file name representing the plain text file data in each of the plurality of files of the computer file system using a cipher stack. In additional aspects, obfuscating each plain text file name may comprise, for example, obfuscating each plain text file name representing the plain text file data in each of the plurality of files of the computer file system using a series of different cipher tables of the cipher stack. In further aspects, obfuscating each plain text file name may involve, for example, obfuscating each plain text file name representing the plain text file data in each of the plurality of files of the computer file system using a series of different substitution cipher tables of the cipher stack. In still further aspects, obfuscating the plain text file name may involve, for example, obfuscating each of a plurality of characters of each plain text file name representing the plain text file data in each of the plurality of files of the computer file system using a different one of a series of different substitute cipher tables of the cipher stack for each of the plurality of characters of each plain text file name.

In other aspects of embodiments of the invention, obfuscating the plain text file data in each of the plurality of file may involve, for example, generating a hash value for the plain text file data in each of the plurality of files in the computer file system. In additional aspects, obfuscating the plain text file data in each of the plurality of files may involve, for example, creating a random substitution cipher using the respective hash values for the plain text file data in each of the plurality of files in the computer file system as seed values to a random number generator. In still further aspects, obfuscating the plain text file data in each of the plurality of files may involve, for example, randomly shuffling positions of run lengths for each of the plurality of files in the computer file system with no run lengths having identical run length values disposed adjacent one another. Still other aspects may involve, for example, generating an obfuscated version of each of said files using the substituted, shuffled, run lengths Additional aspects of embodiments of the invention may involve, for example, generating a synthetic version of each of the obfuscated file names, the obfuscated directory name for each obfuscated file name, and the obfuscated file data associated with each obfuscated file name for each of the plurality of files of the computer file system. In further aspects, generating the synthetic version of each of the obfuscated file names, the obfuscated directory name for each obfuscated file name, and the obfuscated file data associated with each obfuscated file name may involve, for example, generating a synthetic version of each of the plurality of files of the computer file system having a same entropy value as an entropy value of the plurality of plain text files in the file system.

In further aspects of embodiments of the invention, generating the synthetic version of each of the obfuscated file names, the obfuscated directory name for each obfuscated file name, and the obfuscated file data associated with each obfuscated file name may involve, for example, generating a synthetic version of each of the plurality of files of the computer file system having a same randomness as the plurality of plain text files in the file system. In still further aspects, generating the synthetic version of each of the obfuscated file names, the obfuscated directory name for each obfuscated file name, and the obfuscated file data associated with each obfuscated file name may involve, for example, generating a synthetic version of each of the plurality of files of the computer file system having a same compressibility as the plurality of plain text files in the file system.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 5 illustrates an example of plain text and obfuscated ciphertext for file names for embodiments of the invention.

DETAILED DESCRIPTION

Figure 1:
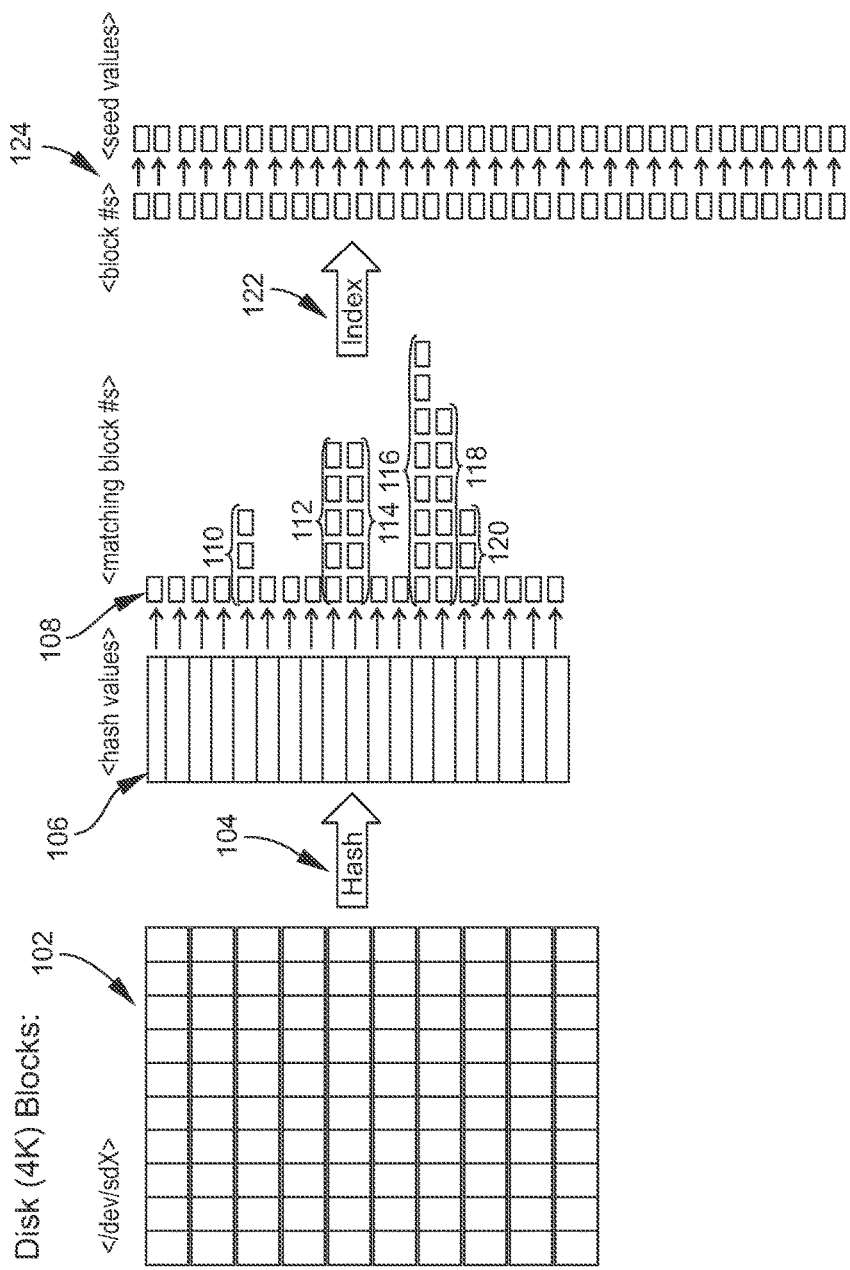
FIG. 1 is a pictographic representation of an example of a process of analyzing a block data storage device and generating a block index to (hash) seed values according to embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provides methods and systems for generating "synthetic" data sets which have the same deduplication characteristics as an entity's existing data but which contain no confidential data. A "synthetic" data set may be an anonymized data set that matches the real data in its theoretical ability to be dedeuplicated and/or compressed. Such "synthetic" data sets may be used to quantify the potential effectiveness of deduplication and compression of the entity's data using one or more deduplication and compression systems by one or more vendors of such systems at the vendors' own facilities with minimal involvement of the entity and without exposing any confidential data of the entity.

Thus, embodiments of the invention address a unique problem of evaluating deduplication and compression systems outside an entity without exposing the entity's stored data. The solution provided by embodiments of the invention is inextricably tied to the technology in which the problem arose. It assures that evaluations are performed quickly and efficiently without exposing PII or confidential information outside such an entity that is under an obligation to protect such information, while at the same time assuring that the results of tests to evaluate such systems are accurate and valid against one another other. Further, it improves the technology by allowing such evaluations which would otherwise be impossible.

Typically, the type of block storage system proposed for evaluation by an entity, such as a financial institution, health care provider, government agency or other institution that stores and processes data, may be a solid state based storage systems because of the ability of such systems to deduplicate and compress data, which may be a key feature in a financial institution, health care provider, government agency or other institution that stores and processes data, environment and for which solid state storage may be particularly well adapted. However, it is to be understood that embodiments of the invention are not limited to use with such systems but may be employed with any type of block storage system that involves deduplication and compression of data.

As a somewhat oversimplified example of the deduplication process, assume that employee A of an entity sends a document electronically to employee B within the same entity, and both employees then store their respective copies of the document on a block storage device of the entity. Thus, employee A may perceive that she has a copy of the document, and employee B may likewise perceive that she also has a copy of the document. However, in the background, the block storage system of the entity may detect identical blocks of data within the data that makes up the document, and instead of storing two separate copies of the document, the block storage system may simply provide a reference to the document such that employees A and B share the same copy of the document.

A typical mechanism for deduplication may be hashing using one or more hash algorithms. An example of a hash algorithm that may be employed for that purpose may be the MD5 message-digest algorithm. However, there are numerous hashing algorithms that would be suitable to use in the algorithm including but not limited to: MD5, SHA-1, BLAKE, Skein etc. It is to be understood that embodiments of the invention are not limited to any particular deduplication mechanism or any particular hash algorithm. For example, a block storage system may calculate a hash across a block of stored data, such as a block of data containing 4096 bytes, whereupon the resulting hash would obviously be much shorter than 4096 bytes. If another block of similarly hashed data is identified by the system as having the same hash, there is a reasonable expectation that those two blocks of stored data are identical. Embodiments of the invention may exploit that aspect of deduplication.

A feature of embodiments of the invention may relate to analysis of a vendor's system to evaluate its ability to deduplicate data. Typically, deduplication on such systems may be performed, for example, on 4096-bytes (4K) block alignments of data. It is to be understood, however that such systems may perform deduplication, for example, on larger blocks of data, such as 8K (8192 bytes) blocks of data, or on smaller blocks, or on blocks of variable sizes. The principle is the same regardless of the size of the data blocks.

In a deduplication aspect of embodiments of the invention, each 4K block of data in a block device may be examined, and a hash value, such as an MD5 hash value, may be calculated across each block of data. The hash values may then be placed into an index table that maps each hash value to a matching block of data. Thus, the table of hash values may reference obfuscated block definitions of each block of data which contain no PII but which are in the same order and frequency as in the underlying blocks of data.

It will be appreciated that a large block storage device may have a significantly large number of blocks of data that are identical to one another, for example, because multiple copies of the same data may be stored in the database, or blocks may quite often be zero because they have not yet been used. As noted, the index table presents a map of hash values to block numbers in the same order and frequency as in the underlying blocks of data. Embodiments of the invention may next invert the index which may involve, for example, walking or stepping through the index using the hash of each block to determine which blocks are identical.

A list of the block numbers may then be generated to use the hash values as seed values to a random number generator. Those seed values to the random number generator may then be employed to generate a "synthetic" version of each block that has the same pattern as the block device but contains only random data. This deduplication analysis aspect of embodiments of the invention provides an effective tool to evaluate the ability of an underlying data storage system to deduplicate blocks of data, because it enables generation of a block device that has the same "synthetic" version (i.e., same pattern of blocks) as the original stored data but contains no confidential data.

Another feature of embodiments of the invention may relate, for example, to evaluating the ability of a vendor's system to compress data as it is stored or written to a block storage device. This feature may include, for example, an ability to generate data that has the same compressibility as the original data while nevertheless obscuring or obfuscating the PII associated with the original data. In embodiments of the invention, the compressibility of the data may be hypothesized to be dependent on factors, such as a randomness of the data sets and a frequency of run lengths within the data sets as represented, for example, by a data histogram. A measure of randomness of data in a data set may be the entropy of the data set. Thus, in embodiments of the invention, it may be further hypothesized that in order to preserve the compressibility of the original data in a "synthetic" version of the data, the entropy and the data histogram of the "synthetic" data must be substantially the same as those of the original data.

An aspect of this feature may involve, for example, generating a "synthetic" data set that has a level of entropy and a data histogram that is equivalent to that of the original data set. It is to be understood that there are many different methods of determining entropy, including many different algorithms for computing entropy values. For example, a common and well-known measure of entropy is Shannon entropy. It is to be further understood that although embodiments of the invention may be described herein with reference to Shannon entropy, embodiments of the invention may employ any other measure of entropy.

Regarding the data histogram aspect, as data is stored, there may typically be runs of the same bits of a byte. An example of a trivial case may be a block of 4096 bytes of data consisting of all zeros, which means the block has only a single run length, for example, of 4096 bytes that contain only zeros. Another trivial case example may be a block of 4096 bytes of data of which the first half consists only of fives and the second half consists only of zeroes, which means the block has two run lengths, one with 2048 bytes that contain only fives and another with 2048 bytes that contain only zeros.

The data in a block of data may be represented as a list of run lengths, and that list of run lengths and the frequency of those run lengths may be used, for example, to create a bar graph or histogram. The resulting histogram may serve, for example, as a signature of that block of data. A run length may be characterized from a mathematical perspective as a tuple that specifies where the run length begins and ends and the data that it contains. In the foregoing trivial case of a block of 4096 bytes of data containing all zeros, the run length may begin at zero, end at 4096, and contain a single value.

If one has access to a sufficient number of tuples for a particular block of data, it may be possible to reconstruct the data in that block, as long as the tuples are available in the correct order. A possible solution in that case may be to analyze data blocks, construct histograms in each case and then simply apply a substitution cipher to the data, such as changing all zeros to ones, fives, threes, or the like. However, that suggestion would likely be susceptible to a cryptographic attack referred to as frequency analysis.

A simple version of cryptographic attack in that case may involve, for example, referring to the statistical frequency of the occurrence of particular letters in the language of text represented by the data in the data block. For example, it is known that the letter E is the most commonly occurring letter in the English language. Thus, if one knows that the data in a data block represents text, it would be possible to determine by frequency analysis of the bytes in the data block, regardless of the particular values, that the most commonly occurring value almost certainly represented the letter E. Repeating that process, for example, using the next most commonly occurring letters may enable one to effectively reconstruct the text represented by the data block.

The foregoing illustrates an example of the vulnerability of a substitution cipher to a very simple cryptographic attack. Embodiments of the invention reduce this vulnerability by not only employing a substitution cipher but also scrambling or shuffling the order of the data block run lengths. Therefore, even if an attacker were able to perform such a frequency analysis of the bytes in the data block and identify letters represented by particular values, the resulting text would be unintelligible, because of the random shuffling of the run lengths. In other words, while the attacker may be able to see that the data block represents text, it would difficult for the attacker to make any sense of the text, and PII in the data would be protected from disclosure.

Further, in order to preclude a possibility of the random shuffling of run lengths resulting in inadvertently placing run lengths having the same value adjacent one another and thereby unintentionally extending run lengths, embodiments of the invention explicitly preclude placing same value run lengths adjacent one another when the random shuffling of run lengths is performed. That explicit preclusion guarantees that the data in the data block, including any PII, is obfuscated in that it has different values and different positions, while at the same time retaining the same degree of compressibility and randomness as measured, for example, by its entropy value, such as its Shannon entropy value.

Embodiments of the invention may involve, for example, manipulation of two aspects of run lengths to create a new histogram. A first aspect that may be manipulated is the positions of the run lengths and a second aspect that may be manipulated is the values of those run lengths. Generation of the histogram may result, for example, in a list of run lengths that are the same but occupy different positions in the data block and have different values associated with them. That histogram may then be used to generate a "synthetic" data block that has the same entropy and therefore the same compressibility as the original data block.

As previously noted, in a trivial case example, a block of 4096 bytes may consist of all zeros, which means the block has only a single run length of 4096 bytes that contains only zeros. In another trivial case example, a block of 4096 bytes consisting entirely of random data may have 4096 different run lengths. However, while it is possible to generate a histogram of a block of 4096 bytes consisting entirely of random data, the data stored in a typical block storage system is generally very self-similar, so that situation is not likely to occur as a practical matter. As previously noted, while the examples herein relate primarily to blocks of 4096 bytes, embodiments of the invention are not limited to such block sizes and may relate to data blocks of any other sizes.

It is to be understood that embodiments or the invention are independent of the particular compression algorithm that may be used to compress the data. For example, there are currently many types of data compression algorithms available. Typically, these types of algorithms may be based upon what is commonly implemented in a program known as PKZIP, which is a variant of run-length encoding. In embodiments of the invention, as illustrated by measuring the entropy of the data, the compressibility of the data is independent of the manner in which the data is compressed. While there may be specific compression algorithms in existence that perform, for example, by basing compression on knowledge of the underlying data, such specialized compression algorithms are not generally employed in general-purpose data storage systems, such as discussed herein.

In embodiments of the invention, when random data is substituted in each individual block, each of the block signatures becomes its own one-time pad, and one-time pads are generally considered to be unbreakable. FIG. 1 is a pictographic representation of an example of a process of analyzing a block data storage device and generating a block index to (hash) seed values according to embodiments of the invention. Referring to FIG. 1, the notation </dev/sdX> may represent, for example, a name or identifier of a block storage device. A particular data storage system may have any number of such devices, in which case each device may have its own device name or identifier, for example, with the X replaced by some other letter or numeral. The grid 102 of the pictograph may represent, for example, the 4096 blocks that make up the particular block storage device. Again, it is to be understood that 4096 blocks is illustrative only and that the storage device may include any other number of blocks.

Referring further to FIG. 1, at 104, a hash value may be created for each of the blocks in the grid 102, as illustrated by the list 106 of hash values for each block. Thereafter, each hash value for each of the blocks in the grid 102, as illustrated by the list 106 of hash values for each block, may be matched to its corresponding block as illustrated in the corresponding list of blocks 108, each of which blocks has a logical block address or block number. Thus, each hash value, as illustrated in the list 106, that was catenated across the block, as represented by the grid 102, may be mapped to the corresponding or matching block number, as illustrated in the list 108 of matching block numbers, and in the case of multiple blocks having identical hash values, to multiple block numbers.

For example, a hash value, as illustrated in the list 106, that is identical for multiple blocks may be mapped to multiple block numbers, such as groups of block numbers 110, 112, 114, 116, 118, and 120. Assume, for example, that the group 110 of three block numbers are blocks numbered 5, 17 and 350. Thus, the blocks numbered 5, 17, and 350 have identical hash values, which indicates that each of those blocks has the same content. Likewise, groups of block numbers 112, 114, 116, 118, and 120 represent other sets of multiple blocks in which each block in a group has a hash value that is identical to the hash values of the other blocks in the group, indicating that the blocks in a particular group all have the same content.

Referring again to FIG. 1, at 122, an indexing process is performed that involves, for example, walking the list of hash values 106 and matching block numbers to seed values generated from the corresponding block numbers, as illustrated in index 124. Assume, for example, that the first hash value in the list of hash values 106 is mapped to matching a block that is numbered 10. Thus, the tenth entry in the index 124 may then map to a seed value generated from the hash value associated with the block numbered 10. Further, in the earlier example of the group 110 of three block numbered 5, 17 and 350 that have identical hash values, those blocks at the fifth, 17th, and 350th positions in the index 124 all map to the same seed value generated from the same hash value in index 124.

Figure 2:
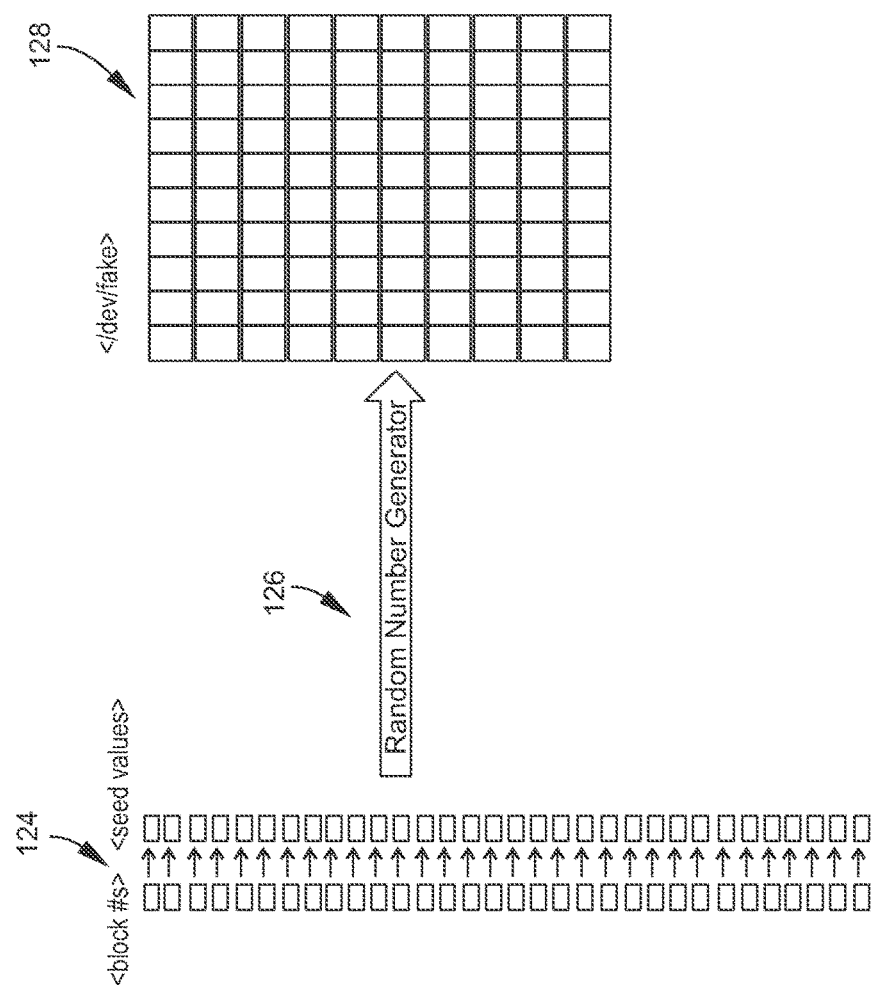
FIG. 2 is a pictographic representation of an example of the process for embodiments of the invention of generating a "synthetic" version of the original data block of FIG. 1 with the same pattern of blocks as the original block device but with random data.

FIG. 2 is a pictographic representation of an example of the process for embodiments of the invention of generating a "synthetic" version of the original data block of FIG. 1 with the same pattern of blocks as the original block device but with random data. Returning again to the example of the group 110 shown in FIG. 1 of three block numbers 5, 17 and 350 that have identical hash values, as noted above, in index 124, the same seed value appears at the fifth, 17th and 350th places in the list of block numbers 124. Therefore, that same seed value is used at 126 to seed a random number generator for each of the blocks numbered 5, 17 and 350, such that the data in each those blocks is also identical.

Repeating the process of seeding the random generator with the seed values for each block number to generate "synthetic" data may result in a perfect image and pattern of the original block device, but containing different data from the original blocks. Using the "synthetic" data, embodiments of the invention enable evaluating a particular deduplication system by a vendor outside an entity without exposing any PII or other confidential information of an entity. In other words, while the example of the blocks of "synthetic" data represented by grid 128 in FIG. 2 is an image with the same pattern as the example of the blocks represented by grid 102 in FIG. 1, the blocks of "synthetic" data represented in FIG. 2 themselves contain no PII.

Figure 3:
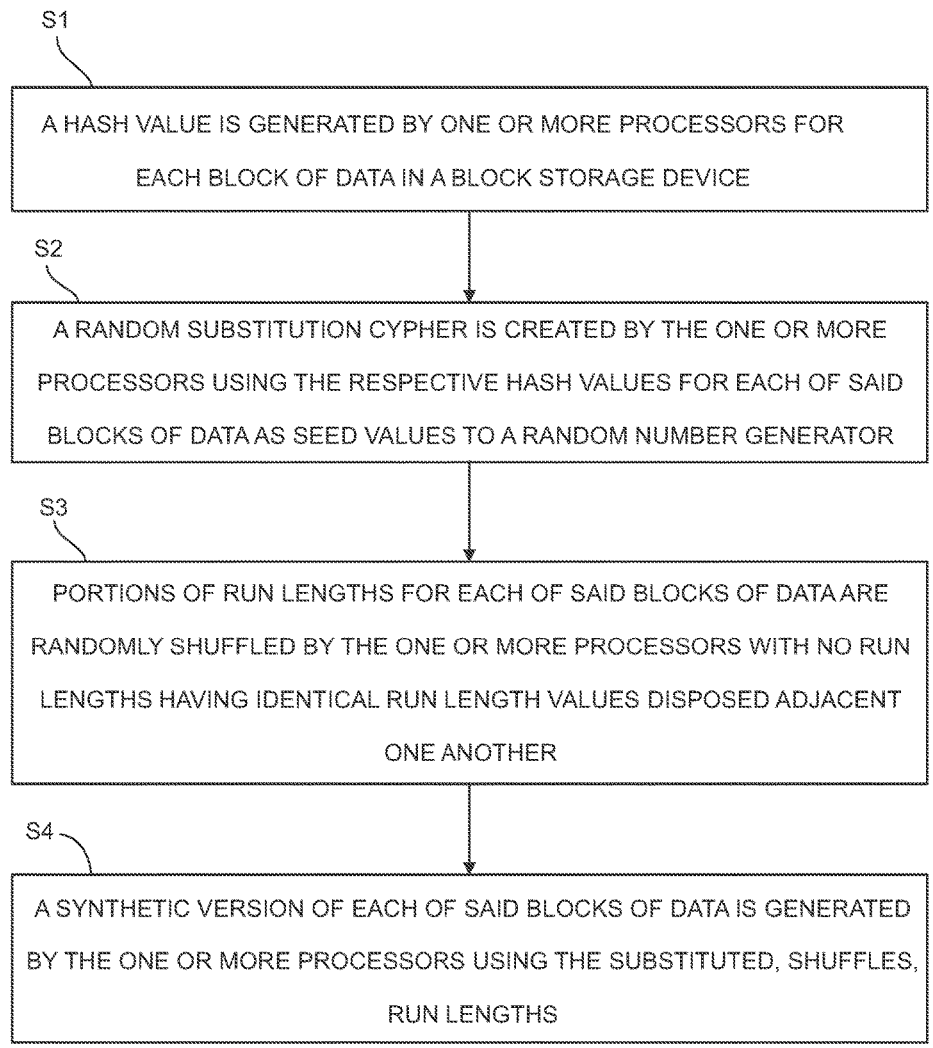
FIG. 3 is a flow chart that illustrates an example of the process for embodiments of the invention of generating a "synthetic" version of obfuscated blocks of data from blocks of data in a block storage device having a same randomness and compressibility as the blocks of data in the block storage device.

FIG. 3 is a flow chart that illustrates an example of the process for embodiments of the invention of generating a "synthetic" version of obfuscated blocks of data from blocks of data in a block storage device having a same randomness and compressibility as the blocks of data in the block storage device. Referring to FIG. 3, at S1, a hash value is generated by one or more processors for each block of data in a block storage device. At S2, a random substitution cipher is created by the one or more processors using the respective hash values for each of said blocks of data as seed values to a random number generator. At S3, positions of run lengths for each of said blocks of data are randomly shuffled by the one or more processors with no run lengths having identical run length values disposed adjacent one another. At S4, a "synthetic" version of each of said blocks of data is generated by the one or more processors using the substituted, shuffled, run lengths.

In order to confirm that embodiments of the invention work equally well for compression analysis, a first test was performed in which run lengths were generated for an example using a simple block device having 16 unique bytes. It is to be understood that such an example block device represents a simple test case to confirm that substituting the positions and the values of the blocks results in no change in the compressibility of the data and in no way limits a scope of embodiments of the invention. Since the 16 bytes were unique, the run length values were each 1 and the run lengths extended, for example, from position 0 to position 1, from position 1 to position 2, from position 2 to position 3, and so on up to from position 15 to position 16. For each of the 16 unique blocks in the system, a Shannon entropy value was calculated, and it was determined that 4 bits per symbol (or byte), or a total of 64 bits was needed for an ideal encoding of the 16 unique blocks.

Thereafter, a run-length histogram of the block was generated, and a random cipher substitution was performed on the histogram values. The run length positions were then randomly shuffled with a rule not to place same valued run lengths adjacent one another. Next, the substituted, shuffled, run lengths were used to generate a "synthetic" data block. The Shannon entropy value was then calculated for the "synthetic" data block and found to be identical to the Shannon entropy value that was calculated for the original data block (i.e., 4 bits per symbol with an ideal encoding of 64 bits). Likewise, a run-length histogram of the "synthetic" data block was generated and found to be similar to the histogram that was generated for the original data block. The foregoing first test represents a trivial case which confirms that substituting the positions and the values of the blocks results in no change in the compressibility of the data.

A second test was also performed that is more typical of various different run lengths that may be present in a data storage device likewise having, for example, 16 bytes. It is likewise to be understood that such a simple example block device represents a simple test case to confirm that substituting the positions and the values of the blocks results in no change in the compressibility of the data and in no way limits a scope of embodiments of the invention. In the second case, for example, the first run length value was 3 and its run length extended from position 0 to position 3, the second run length value was 4 and its run length extended from position 3 to position 7, the third run length value was 1 and its run length extended from position 7 to position 8, the fourth run length value was 3 and its run length extended from position 8 to position 11, the fifth run length value was 2 and its run length extended from position 11 to position 13, the sixth run length value was 3 and its run length extended from position 13 to position 16.

In the second test, a Shannon entropy value was calculated for each of the blocks in the system, and it was determined that 1.59 bits per symbol (or byte), or a total of 6.36 bits was needed for an ideal encoding of the 16 blocks.

Thereafter, a run-length histogram of the block was generated, a random cipher substitution was performed on the histogram values, and the run length positions were randomly shuffled with a rule not to place same valued run lengths adjacent one another. Next, the substituted, shuffled, run lengths were used to generate a "synthetic" data block, and the Shannon entropy value was calculated for the "synthetic" data block.

As in the first test, the Shannon entropy value for the "synthetic" data block was determined and found to be identical to the Shannon entropy value that was determined for the original data block (i.e., 1.59 bits per symbol with an ideal encoding of 6.36 bits). Also as in the first test, a run-length histogram of the "synthetic" data block was generated and found to be similar to the histogram that was generated for the original data block. Thus, the test representing a case more typical of the type of behavior that may be seen with stored data confirms that substituting the positions and the values of the blocks results in no change in the compressibility of the data.

Other aspects of embodiments of the invention may extend, for example, to analysis of file systems. For example, particular deduplication and compression systems may operate at a file system level, and the block storage analysis aspect for embodiments of the invention may be extended to such file systems. A file system is the way in which a computer organizes data into files and in which the files are named and where they are placed logically for storage and retrieval. For example, the file system analysis aspect for embodiments of the invention may similarly create synthetic data that is representative of a file system for compression and deduplication purposes.

In the file system analysis aspect, embodiments of the invention may be coupled to a file system. A relatively simple example of a file system may be a C: drive of a computer having WINDOWS® operating system installed. The C: drive of the computer and all of the data and files on the C: drive may be characterized as an example of a single self-contained file system that makes no reference to anything outside itself. Thus, embodiments of the invention may be coupled to a file system, such as the C: drive of a computer, and all of the files and directories on the file system (i.e., the C: drive) may be examined.

It is to be understood that the file system analysis aspect is not limited, for example, to a C: drive file system but may be employed with any other file system including, without limitation, any disc-based file system, network-based file system, or virtual file system. In a manner similar to the way in which the block storage device analysis aspect enables an understanding of implications of deduplication in block storage devices, the file system analysis aspect for embodiments of the invention may enable an understanding of implications of deduplication in file systems.

Returning to the example of a computer C: drive file system, a common occurrence may be copying the same file multiple times in multiple different places of the file system. Consequently, the same data may be stored multiple times in the file system of the computer, which is a waste of storage space. A more efficient solution provided by the file system analysis aspect is to store one copy of the particular data in the file system of the computer and a simple counter that indicates the number of copies corresponding to the single stored copy.

In the case, for example, of a file server in an organization, as documents are sent back and forth between various people in the organization, such documents may be saved and repeatedly resaved, which is likewise a significant waste of storage space. The more efficient solution provided by the file system analysis aspect is for the file system to recognize that the particular data was already stored and that it is only necessary to store a reference to that data.

In the file system analysis aspect for embodiments of the invention, each file may be examined and a hash value may be generated for each file in the file system. In addition, an index of the hash values corresponding to files in the file system may be generated. Thus, according to embodiments of the invention, the file system may be examined and indexed, and a hash value of each file may be calculated.

In the file system analysis aspect for embodiments of the invention, each file may be examined in a manner similar to the way in which individual blocks of data are examined in the block storage device analysis aspect. For example, a hash value may be generated as a unique signature for each file in the file system analysis aspect similar to the way in which hash values are generated of each block of data in the block storage device analysis aspect. Likewise, similar to the way in which the respective hash values are mapped or indexed to identifiers for corresponding blocks of data in the block storage device analysis aspect, an index of hash values to corresponding files in the file system may be generated in the file system analysis aspect for embodiments of the invention.

Thereafter, similar to the manner in which the compressibility of data may be evaluated and measured in the block storage device analysis aspect, the file system analysis aspect for embodiments of the invention may involve measuring how much each file in a file system can be compressed. For example, in embodiments of the invention, a file system may deduplicate files to avoid storing multiple copies and may also store files in a compressed format to reduce the amount of storage needed for a given number of files.

The file system analysis aspect for embodiments of the invention may employ an entropy measure to estimate the efficiency of file system compression. In a manner similar to the manner in which entropy of a data set may be measured in the block storage device analysis aspect, the entropy of each file in a file system may be measured in the file system analysis aspect for embodiments of the invention. For example, in the file system analysis aspect, the hash value for each file in the file system may be used to determine its ability to deduplicate the files, and the entropy measure may determine its theoretical ability to be compressed. Thus, the entropy of each file may measured, and a run length histogram for each file may be calculated.

Similar to the manner in which the order of data block run lengths may be scrambled or shuffled around different parts of the histogram and random cipher substitution may be performed on the histogram values in the block storage device analysis aspect, using the same process with files in the file system analysis aspect of embodiments of the invention, equivalent files may be reconstructed that have the same size, deduplication, and compression characteristics as the original files, while containing no PII.

Again, in the same process in which files are accessed or traversed, run length histograms of the complete files may be generated that allow reconstruction of those files. Similar to the way in which run length histograms are created for a block of data which can be used to reconstruct a block in the block storage device analysis aspect, the file system analysis aspect for embodiments of the invention may involve, for example, creating run length histograms for each file in the file system, which can likewise be used to reconstruct the original files.

Further, similar to the manner in which the order of data block run lengths may be scrambled or shuffled around different parts of the histogram and random cipher substitution may be performed on the histogram values in the block storage device analysis aspect, in the file system analysis aspect of embodiments of the invention, using the same process with files, equivalent files may be reconstructed that have the same size, deduplication, and compression characteristics as the original files, while containing no PII. The file and directory names or metadata of the file system may also be obfuscated. Thus, all data in the original files can be obfuscated, so that the data may be cryptographically sanitized, and tests can be performed on the equivalent files without exposing any personal information.

It is noted that a similar process of creating a substitution cipher using hash values as seed values may be employed in the file system analysis aspect of embodiments of the invention as in the block storage device analysis aspect. However, a difference between the two processes may be that in the block storage analysis aspect, the input and output block size for every block of data may be the same, such as 4 k bytes or some other fixed block size in all blocks, whereas the file system analysis aspect for embodiments of the invention may deal with variable files lengths.

As noted, the order of file run lengths may be scrambled or shuffled around different parts of the histogram, and random cipher substitution may be performed on the histogram values in the file system analysis aspect, similar to the block storage analysis aspect, except that the file run lengths are variable rather than fixed. However, both the input and the output run lengths for a particular file are the same size. For example, for a particular file, such as a file of 6522 bytes as the input, the output of the process may also be 6522 bytes for that file. For another file, for example, of 1015 bytes as the input, the output of the process may be 1015 bytes for that file.

It is to be noted that in the file system analysis aspect for embodiments of the invention, when the run-length histogram of the block is generated, and the random cipher substitution is performed on the histogram values, the run length positions may be randomly shuffled with a rule not to place same valued run lengths adjacent one another, similar to the block storage analysis aspect. As in the block storage analysis aspect, the file system analysis aspect for embodiments of the invention may also involve employing the substituted, shuffled, run lengths of the obfuscated histogram to generate a "synthetic" version of the file with the same compressibility as the original file.

Finally, as in the block storage analysis aspect, the file system analysis aspect for embodiments of the invention may likewise involve calculating an entropy value, such as the Shannon entropy value, for the "synthetic" version of the file and comparing that entropy value to the entropy value calculated for the original file to confirm that substituting the positions and the values of the blocks results in no change in the compressibility of the data.

In the file system analysis aspect for embodiments of the invention, in the example of a computer C: drive, the file system on the computer may be indexed by simply beginning at the root of the C: drive and making a record of all the files on the computer by traversing all directories and noting all files under each directory name, and the files may be hashed. Thereafter, the entropy of each file may be determined, and the run-length histogram for each file may be generated.

It is to be noted that while that process for the file system analysis aspect for embodiments of the invention may obfuscate the files on the C: drive of a particular computer, the names of files and directories on the C: drive of the computer, referred to as "metadata", may not be appropriately obfuscated. Thus, under certain circumstances, information of a confidential nature my be exposed. For example, the name of one or more files in the file system may include personal names of one or more people as part of the file name. Consequently, in the file system analysis aspect for embodiments of the invention, the metadata may be obfuscated as well.

In the file system analysis aspect for embodiments of the invention, obfuscating the metadata may involve, for example, certain limitations. A goal of obfuscating this file system metadata may be, for example, to construct a list of file names in file system directories, referred to as file system metadata, that has the same structure as the original file system metadata, but which may be characterized as "gibberish" from a human-readable point of view.

As noted, there are limitations on what may be done to a file name and have it remain valid from a file system metadata perspective. For example, there are typically certain special characters in a file name, such as slashes that may be used to represent directories. Thus, a file system may not be expected to understand a slash that is randomly inserted in a file name. For another example, the characters must be printable. They cannot simply be data that is entirely random because there may be many items in a character set that are not valid keys for a file name.

The foregoing represents examples of limitations on a substitution cipher for obfuscating file system metadata. Further, the transformation must also be consistent. For example, when a path name is transformed, the full path name that includes the entire directory hierarchy associated with a particular file, as the transformation walks through all the files that are in the directory, must be consistent. In other words, the same directory hierarchy from the original file system must map correctly to the obfuscated file system hierarchy. Thus, there are a number of limitations in obfuscating a file system directory that are imposed by the nature of the file system.

Consequently, in obfuscating the file system metadata, it may not be possible to perform a quick random transformation. The simple, most trivial way in which to obfuscate the file system metadata may be, for example, to create a simple substitution cipher. The simplest possible substitution cipher may be, for example, replacing each letter in the alphabet with the immediately succeeding letter, so that every A becomes a B, every B becomes a C, every C becomes a D, and so on through the alphabet and ending with every Z becoming an A. That would be a very simple, single shift substitution cipher, which may be the most trivial case. If such a simple, substitution cipher were used for all the file names in all the files on a computer, the result would be ciphertext but it would also be simple for anyone to decipher, in which case it creates a potential risk of exposing PII or confidential information.

A more complex cipher may be to perform a random substitution cipher, such as every A becoming an I, every B becoming a J, every C becoming an E, and similar random substitutions all the way through the alphabet to Z for all file names in a file system directory. Such a random substitution cipher may be harder to decipher, and the result would similarly be ciphertext. However it is also a very trivial cipher and similarly relatively easy to decipher, so there is likewise a risk of exposing confidential information.

Figure 4:
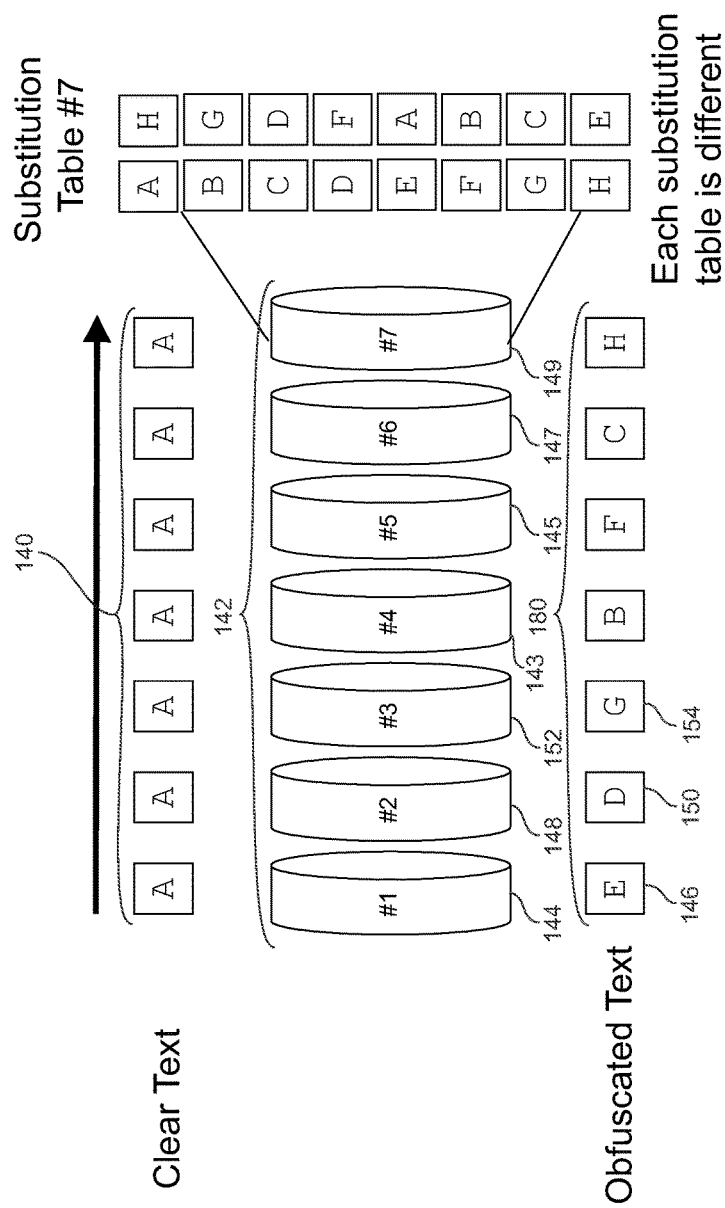
FIG. 4 is a schematic diagram that illustrates an example of a stack of randomly generated substitution ciphers for embodiments of the invention.

In embodiments of the invention, several of such substitution ciphers may be stacked together. FIG. 4 is a schematic diagram that illustrates an example of a stack of randomly generated substitution ciphers 142 for embodiments of the invention. Referring to FIG. 4, a file name 140 in a file directory in clear text is illustrated by the letter A. For example, assume that the file name 140 is comprised entirely of the letter A or AAAAAAA. In a simple substitution cipher, such as having all A's become B's, the obfuscated version of the file name 140 would appear as all B's or BBBBBBB. As previously noted, such a simple substitution cipher is very weak and easy to decipher and thus has a very high risk of exposing confidential information.

Referring to FIG. 4, embodiments of the invention may employ, for example, a succession or stack of multiple different cipher tables 142. In embodiments of the invention, after using a first cipher table 144, for example, to substitute the letter E for the letter A in the first position 146 of the file name 140, a different substitution cipher table 148 may be employed for the succeeding letter in the second position 150 of the file name 140. Likewise, another substitution cipher table 152 that is different from the substitution ciphers used for the letters in the first 146 and second 150 positions may be employed for the succeeding letter in the third position 154 of the file name 140. This use of different substitution ciphers for each succeeding letter in the file name 140 may continue up to the maximum number of letters that may be permitted in a file name, which is typically a programmatic limitation of all file systems.

In the stacked substitution cipher aspect for embodiments of the invention, certain special characters, such as slashes, dots, and other characters that have special meaning to the file system, may be set up in the substitution ciphers to substitute to themselves. Thus, in every one of the stacked substitution ciphers 142, for example a slash becomes a slash and is not transformed. In that way, the structurally important metadata in a file name or directory name is always maintained.

The general form of a name of a file or a directory, known as a path, specifies a unique location in a file system. FIG. 5 illustrates an example of plain text 160 and obfuscated ciphertext 162 for file names for embodiments of the invention. The stacked substitution cipher aspect for embodiments of the invention may have the property that as one walks down long file names that include all the directories that are represented in them, the same string for the directory and file system hierarchy may be generated for every file for the path that is in the same directory. Thus, while the stacked substitution cipher aspect for embodiments of the invention may be employed in obfuscating the file names, a single substitution cipher may be used for obfuscating the directories.

Referring to FIG. 5, it can be seen that some of the files are in the same directory. For example, a file in the directory, foo.bar.data, has the name/CURRENT 164 and another file in the same directory, foo.bar.data, has the name, /MANIFEST-000002 166. Those are transformed in an obfuscated version, so the foo.bar.data for both of those transformations is changed into the same ciphertext, J82.9Hg.6wpf, which means that when file systems are generated with that metadata they are put in the same place. But the file name, /CURRENT 164, is transformed into its own ciphertext, hrAMcmQ 168, and the file name, /MANIFEST-000002 166, is transformed into different ciphertext, r6abCRUX 170, so the file names are effectively obscured. Thus, as noted above, the stacked substitution cipher is employed in obfuscating the file names, but a single substitution cipher is used for obfuscating each directory consistently.

Referring again to FIG. 4, each character of the clear text file name 140 is enciphered using a different substitution cipher from the cipher stack 142, which results in an enciphered file name 180. Referring further to FIG. 4, each different substitution cipher that is employed in enciphering the different characters of the clear text file name 140 may be characterized as a separate substitution cipher table, such as tables 144, 148, 152, 143, 145, 147, and 149. As noted, the stacked substitution cipher aspect is used only for file names and not for directory names, for which a single substitution cipher is employed.

Further, the stacked substitution cipher aspect is not employed for enciphering the file data itself. Instead, the content of each file is shuffled, and the same technique is applied in enciphering the file data as is employed in enciphering a block of data. Thus, the file data is obfuscated and run lengths of the obfuscated file data are randomly shuffled, and each obfuscated file name is associated with a file of obfuscated data that has the same compression and the deduplication properties as the original file. Consequently, each obfuscated file name points to or represents the obfuscated version of the original content of a particular file. It is to be understood that obfuscation of the file name and obfuscation of the file data for a particular file are performed independently of one another and may be performed at different times or simultaneously.

Figure 6:
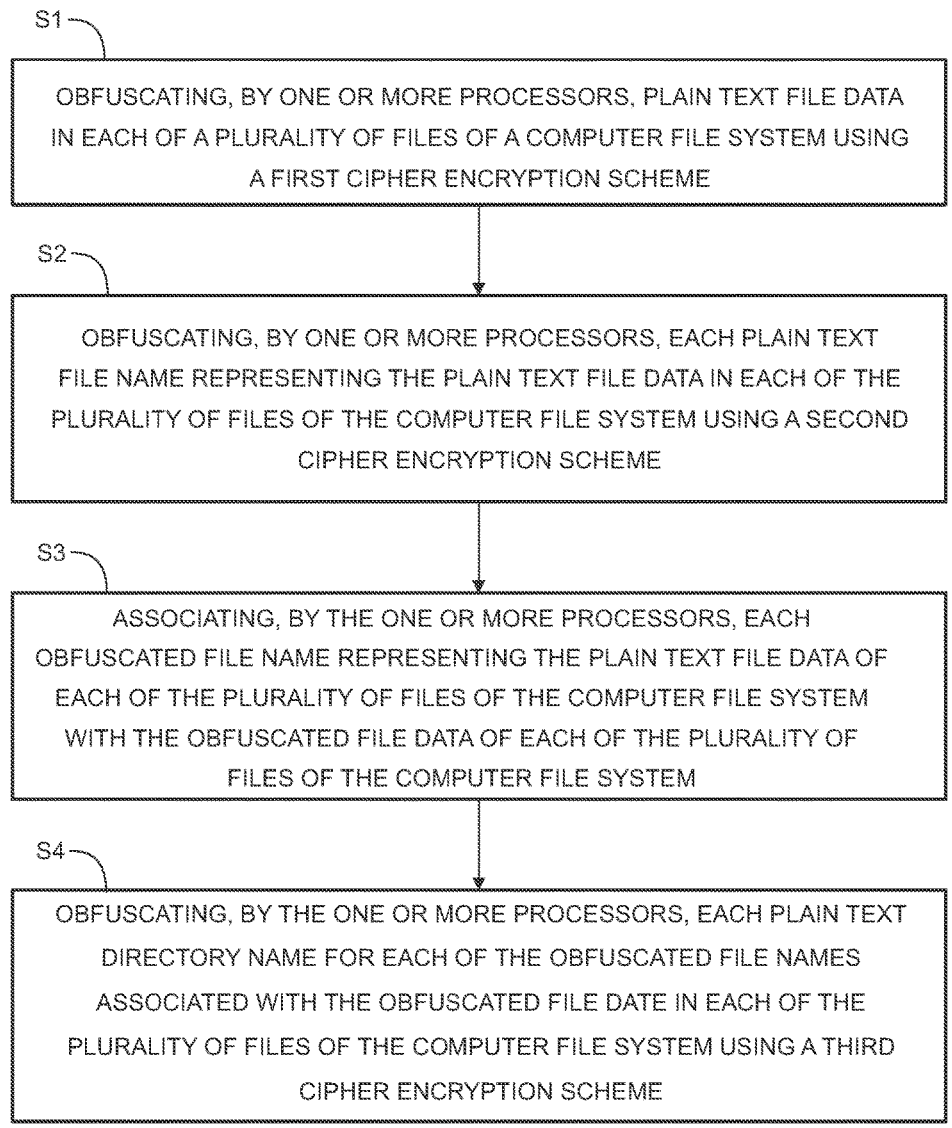
FIG. 6 is a flow chart that illustrates an example of the process for embodiments of the invention of generating an obfuscated version of files in a file system having a same randomness and compressibility as the plain text files in the file system.

FIG. 6 is a flow chart that illustrates an example of the process for embodiments of the invention of generating an obfuscated version of files in a file system having a same randomness and compressibility as the plain text files in the file system. Referring to FIG. 6, at S1, plain text file data in each of a plurality of files of a computer file system may be obfuscated by one or more processors using a first cipher encryption scheme. At S2, each plain text file name representing the plain text file data in each of the plurality of files of the computer file system may be obfuscated by the one or more processors using a second cipher encryption scheme. At S3, each obfuscated file name representing the plain text file data of each of the plurality of files of the computer file system may be associated by the one or more processors with the obfuscated file data of each of the plurality of files of the computer file system. At S4, each plain text directory name for each of the obfuscated file names associated with the obfuscated file data in each of the plurality of files of the computer file system may be obfuscated by the one or more processors using a third cipher encryption scheme.

It is to be understood that the application code for embodiments of the invention may be built, for example, in multiple layers using any suitable coding language to allow its flexibility. It is to be further understood that embodiments of the invention may be implemented as processes of a computer program product, each process of which is operable on one or more processors either alone on a single physical platform, such as a personal computer, or across a plurality of devices, connected by a system or network, including networks such as the Internet, an intranet, a WAN, a LAN, a cellular network, or any other suitable communication network.

Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public communication network, or other transmission device or channel, both wired or wireless. Such instructions may comprise code from any suitable computer programming language. Embodiments of the invention may also employ one or more special-purpose programming languages, such as Structured Query Language designed, for example, for managing data held in a relational database management system, or for stream processing in a relational data stream management system.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system comprising:
one or more processors coupled to memory and programmed to:
obfuscate plain text file data in each of a plurality of files of a computer file system using a first cipher encryption scheme and each plain text file name associated with the plain text file data in each of the plurality of files of the computer file system using a second cipher encryption scheme;
obfuscate each character, except predefined directory naming convention characters, of each plain text directory name for each of the obfuscated file names associated with the obfuscated file data in each of the plurality of files of the computer file system using a third cipher encryption scheme for each plain text directory name; and
generate a synthetic version of each of the obfuscated file names, the obfuscated directory name for each obfuscated file name, and the obfuscated file data associated with each obfuscated file name for each of the plurality of files of the computer file system having at least one of a same randomness and a same compressibility as the plurality of plain text files in the file system.

2. The system of claim 1, the one or more processors being further programmed to generate a hash value for the plain text file data in each of the plurality of files in the computer file system.

3. The system of claim 2, the one or more processors being further programmed to create a random substitution cipher using the respective hash values for the plain text file data in each of the plurality of files in the computer file system as seed values to a random number generator.

4. The system of claim 3, the one or more processors being further programmed to randomly shuffle positions of run lengths for each of the plurality of files in the computer file system with no run lengths having identical run length values disposed adjacent one another.

5. The system of claim 4, the one or more processors being further programmed to generate an obfuscated version of each of said files using the substituted, shuffled, run lengths.

6. The system of claim 1, the one or more processors being further programmed to obfuscate each plain text file name associated with the plain text file data in each of the plurality of files of the computer file system using a cipher stack.

7. The system of claim 6, the one or more processors being further programmed to obfuscate each plain text file name associated with the plain text file data in each of the plurality of files of the computer file system using a series of different cipher tables of the cipher stack.

8. The system of claim 7, the one or more processors being further programmed to obfuscate each plain text file name associated with the plain text file data in each of the plurality of files of the computer file system using a series of different substitution cipher tables of the cipher stack.

9. The system of claim 7, the one or more processors being further programmed to obfuscate each of a plurality of characters of each plain text file name associated with the plain text file data in each of the plurality of files of the computer file system using a different one of a series of different substitute cipher tables of the cipher stack for each of the plurality of characters of each plain text file name.

10. The system of claim 1, the one or more processors being further programmed to obfuscating each plain text file name associated with the plain text file data in each of the plurality of files of the computer file system using a cipher stack.

11. The system of claim 10 the one or more processors being further programmed to obfuscate each plain text file name associated with the plain text file data in each of the plurality of files of the computer file system using a series of different cipher tables of the cipher stack.

12. The system of claim 11, the one or more processors being further programmed to obfuscate each plain text file name associated with the plain text file data in each of the plurality of files of the computer file system using a series of different substitution cipher tables of the cipher stack.

13. The system of claim 11, the one or more processors being further programmed to obfuscate each of a plurality of characters of each plain text file name associated with the plain text file data in each of the plurality of files of the computer file system using a different one of a series of different substitute cipher tables of the cipher stack for each of the plurality of characters of each plain text file name.

14. The system of claim 1, the one or more processors being further programmed to obfuscate each character, except predefined directory naming convention characters, of each plain text directory name for each of the obfuscated file names associated with the obfuscated file data in each of the plurality of files of the computer file system using a substitution cipher.

15. The system of claim 1, the one or more processors being further programmed to generate a synthetic version of each of the plurality of files of the computer file system having a same entropy value as an entropy value of the plurality of plain text files in the file system.

16. The system of claim 1, the one or more processors being further programmed to generate a synthetic version of each of the plurality of files of the computer file system having a same randomness as the plurality of plain text files in the file system.

17. The system of claim 1, the one or more processors being further programmed to generate a synthetic version of each of the plurality of files of the computer file system having a same compressibility as the plurality of plain text files in the file system.

18. A method comprising:
  obfuscating, by one or more processors coupled to memory, plain text file data in each of a plurality of files of a computer file system using a first cipher encryption scheme and each plain text file name associated with the plain text file data in each of the plurality of files of the computer file system using a second cipher encryption scheme;
  obfuscating, by the one or more processors coupled to memory, each character, except predefined directory naming convention characters, of each plain text directory name for each of the obfuscated file names associated with the obfuscated file data in each of the plurality of files of the computer file system using a third cipher encryption scheme for each plain text directory name; and
  generating, by the one or more processors coupled to memory, a synthetic version of each of the obfuscated file names, the obfuscated directory name for each obfuscated file name, and the obfuscated file data associated with each obfuscated file name for each of the plurality of files of the computer file system having at least one of a same randomness and a same compressibility as the plurality of plain text files in the file system.

* * * * *